US012569824B2

(12) United States Patent
Lee et al.

(10) Patent No.: US 12,569,824 B2
(45) Date of Patent: Mar. 10, 2026

(54) CHITOSAN-TITANIUM COMPOSITE, AND PREPARATION METHOD AND USE THEREFOR

(71) Applicant: Korea Atomic Energy Research Institute, Daejeon (KR)

(72) Inventors: Jun Young Lee, Jeongeup-si (KR); Jeong Hoon Park, Jeongeup-si (KR); Min Goo Hur, Seoul (KR); Seung Dae Yang, Jeongeup-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 586 days.

(21) Appl. No.: 18/008,719

(22) PCT Filed: May 26, 2021

(86) PCT No.: PCT/KR2021/006527
§ 371 (c)(1),
(2) Date: Dec. 7, 2022

(87) PCT Pub. No.: WO2021/251654
PCT Pub. Date: Dec. 16, 2021

(65) Prior Publication Data
US 2023/0219054 A1    Jul. 13, 2023

(30) Foreign Application Priority Data
Jun. 8, 2020    (KR) ........................ 10-2020-0069067

(51) Int. Cl.
B01J 20/06    (2006.01)
B01J 20/02    (2006.01)
(Continued)

(52) U.S. Cl.
CPC ........... B01J 20/0211 (2013.01); B01J 20/24 (2013.01); B01J 20/28011 (2013.01);
(Continued)

(58) Field of Classification Search
CPC .. B01J 20/0211; B01J 20/24; B01J 20/28011; B01J 20/3071; B01J 20/3078;
(Continued)

(56) References Cited

U.S. PATENT DOCUMENTS

| | | | |
|---|---|---|---|
| 2013/0168320 A1* | 7/2013 | Pradeep ..................... | C01F 7/34 210/683 |
| 2016/0068410 A1* | 3/2016 | Bahrebar ................ | C02F 1/286 210/660 |

FOREIGN PATENT DOCUMENTS

| | | |
|---|---|---|
| KR | 10-2004-0105357 | 12/2004 |
| KR | 10-2014-0035351 | 3/2014 |
| KR | 10-2015-0097041 | 8/2015 |

OTHER PUBLICATIONS

Vyas, Chirag K., et al. "Chitosan-TiO2 Composite: A Potential 68Ge/68Ga Generator col. Material." Applied Radiation and Isotopes, vol. 149, Jul. 2019, pp. 206-213, 10.1016/j.apradiso.2019. 04.016.
(Continued)

*Primary Examiner* — Cam N. Nguyen
(74) *Attorney, Agent, or Firm* — LEX IP MEISTER, PLLC

(57) ABSTRACT

The present invention relates to a chitosan-titanium composite, a preparation method and use thereof, and more particularly, a chitosan-titanium composite capable of effectively adsorbing and desorbing $^{68}Ge/^{68}Ga$ by combining small molecular chitosan with titanium metal oxide to increase adsorption reactivity to $^{68}Ge$ and $^{68}Ga$ desorption reactivity, and a preparation method and use thereof.

5 Claims, 8 Drawing Sheets

(51) Int. Cl.
  B01J 20/24    (2006.01)
  B01J 20/28    (2006.01)
  B01J 20/30    (2006.01)
  G21F 9/12    (2006.01)

(52) U.S. Cl.
  CPC ....... B01J 20/3071 (2013.01); B01J 20/3078
     (2013.01); B01J 20/3085 (2013.01)

(58) Field of Classification Search
  CPC ............... B01J 20/3085; B01J 2220/46; B01J
     2220/58; B01J 20/3212; B01J 20/3236;
      B01J 20/06; B01J 20/3028; B01J
     20/28019; B01J 20/3206; B01J 20/3217;
      B01J 20/3234; G21F 9/12
  USPC ......................................................... 502/401
  See application file for complete search history.

(56)       References Cited

OTHER PUBLICATIONS

Zhuang, Shuting, et al. "Removal of Cobalt Ions from Aqueous Solution Using Chitosan Grafted with Maleic Acid by Gamma Radiation." Nuclear Engineering and Technology, vol. 50, No. 1, Feb. 2018, pp. 211-215, 10.1016/j.net.2017.11.007.

* cited by examiner

CHITOSAN-TITANIUM COMPOSITE, AND PREPARATION METHOD AND USE THEREFOR

TECHNICAL FIELD

The present invention relates to a chitosan-titanium composite, a preparation method and use thereof, and more particularly, a chitosan-titanium composite capable of effectively adsorbing and desorbing $^{68}Ge/^{68}Ga$ by combining small molecular chitosan with titanium metal oxide to increase adsorption reactivity to $^{68}Ge$ and $^{68}Ga$ desorption reactivity, and a preparation method and use thereof.

BACKGROUND ART

The Ge-68/Ga-68 generator is a device that extracts Ga-68, a daughter nuclide generated from the parent nuclide Ge-68.

This device has the economic advantage of being able to produce radioactive isotopes without using a large facility such as an accelerator, and is easy to transport due to its small size and low weight. In addition, it has the convenience of being able to use for more than a year depending on the amount of radioactivity of Ge-68, which has a half-life of 271 days.

Commercial Ge-68/Ga-68 generators elute Ga-68 ($^{68}Ga$, Gallium-68), which is a daughter radionuclide produced by adsorbing Ge-68 ($^{68}Ge$, Germanium-68), a parent radionuclide, onto a column support to decay the Ge-68. This Ga-68 is a positron-emitting nuclide with a half-life of 68 minutes and is used as a tracer in positron emission tomography (PET) that can diagnose intractable diseases such as tumors and heart disease early.

The PET, which is a medical imaging device used for early diagnosis of intractable diseases, images in vivo functions or metabolic functions.

PET uses a method of imaging by detecting in vitro two 511 KeV extinction radiations, which is generated when a radiopharmaceutical labeled with a radioactive isotope that emits positrons is administered in a living body, and then the positrons emitted from the radiopharmaceutical are combined with surrounding electrons in the human body. The two extinction radiations are emitted in opposite directions according to the law of conservation of momentum, which are measured using a measuring instrument oriented at 360° to reconstruct the distribution of radioactivity, so that biochemical and physiological changes occurring in the human body can be quantitatively evaluated.

Ga has a low melting point of 27.3° C. and is the third element of Group 13 in the periodic table.

Ga metal oxidized to +3 is most stable in aqueous solution, and the free hydrated ions of $Ga^{3+}$ have a stable property only under acidic conditions, whereby an acidic eluent is used in the column separation method. Currently commercial adsorbents for the Ge-68/Ga-68 generator column include metal oxide column agents such as titanium dioxide ($TiO_2$) and tin dioxide ($SnO_2$). However, since these adsorbents have low elution capacity for Ga-68 under acidic eluent conditions, an additional process is applied after column separation so as to increase the elution capacity for Ga-68 by reprocessing the Ge-68 eluate eluted without being adsorbed. Therefore, in order to prepare an adsorbent for a column of a high-efficiency Ge-68/Ga-68 generator, it is necessary to apply an adsorbent having a higher Ga-68 elution capacity than a commercial adsorbent for a titanium dioxide ($TiO_2$) column by using a low concentration hydrochloric acid (HCl) eluate in which $Ga^{3+}$ is stably present. Accordingly, there is a growing need to develop an adsorbent for a Ge-68/Ga-68 generator column that can be stably supplied to the expanding nuclear diagnostic medical industry by applying an adsorbent with excellent initial elution capacity and chemical stability in acidic eluate.

DISCLOSURE

Technical Problem

The present invention is to solve the above problems, and its object is to provide a chitosan-titanium composite capable of increasing adsorption reactivity to $^{68}Ge$ and $^{68}Ga$ desorption reactivity by bonding titanium metal oxide to small molecular chitosan, a method for preparing the same, and a method for obtaining a radioactive isotope using the composite.

However, the technical problems to be achieved by the present invention are not limited to the above-mentioned problems, and other problems not mentioned will be clearly understood by those skilled in the art from the following description.

Technical Solution

The present invention provides a method for manufacturing a chitosan-titanium composite, the method including: a step of preparing a first solution by adding small molecular chitosan powder to an acetic acid solution: a step of preparing a second solution by adding a titanium solution to the first solution; a step of forming a bead by dropping the second solution into ammonia water; and a step of washing, drying and sintering the bead.

In addition, the present invention provides a method for obtaining a radioactive isotope, the method comprising: a step of adsorbing a parent nuclide to the chitosan-titanium composite prepared according to the above method, and then contacting it with an eluent to elute a daughter nuclide.

Further, the present invention provides a chitosan-titanium composite for adsorption of radioactive isotopes, in which titanium is crosslinked to small molecular chitosan as an inert support.

Advantageous Effects

The chitosan-titanium composite according to the present invention has significantly improved stability and elution capacity.

Specifically, in the composite of the present invention, stability against various acid concentrations and physical stress can be secured, and adsorption reactivity to $^{68}Ge$ and $^{68}Ga$ desorption reactivity can be enhanced by bonding titanium metal oxide to small molecular chitosan. Therefore, the composite of the present invention solves the problem of the conventional adsorption material for a $^{68}Ge/^{68}Ga$ generator, and thus can be usefully used as an adsorption material for the $^{68}Ge/^{68}Ga$ generator.

BEST MODES OF THE INVENTION

Figure 1:
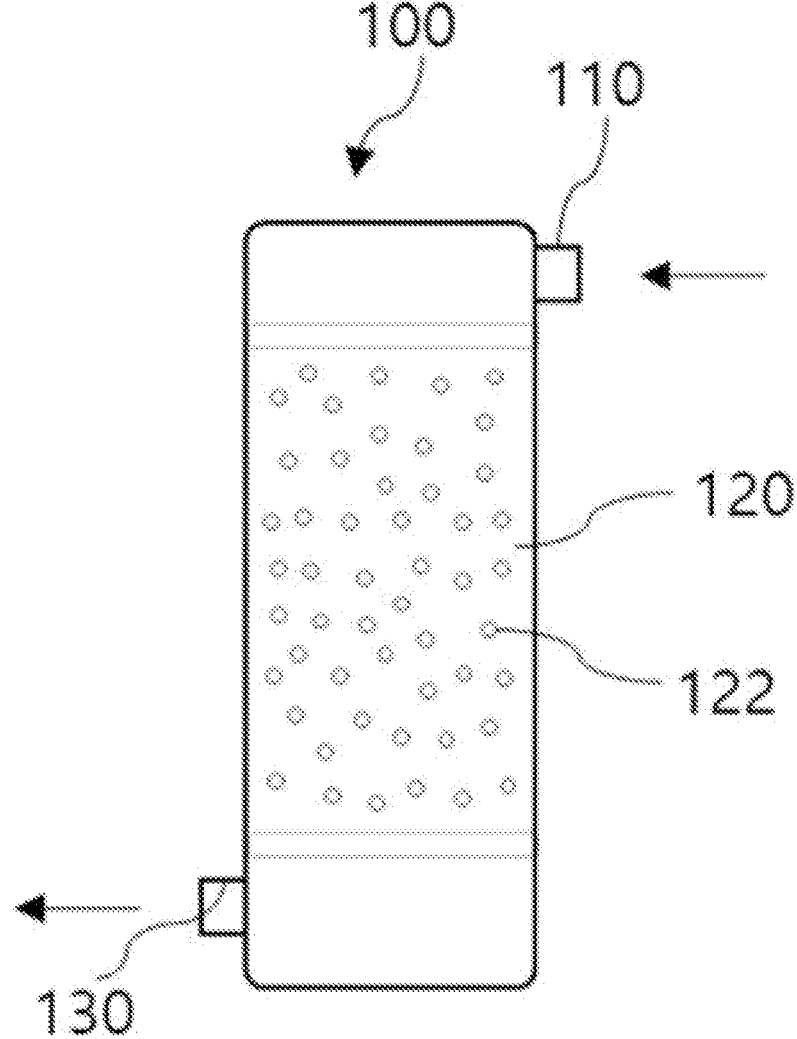
FIG. 1 is a conceptual diagram illustrating the principle of a $^{68}Ge/^{68}Ga$ radioactive isotope generator according to an embodiment of the present invention.
Figure 2:
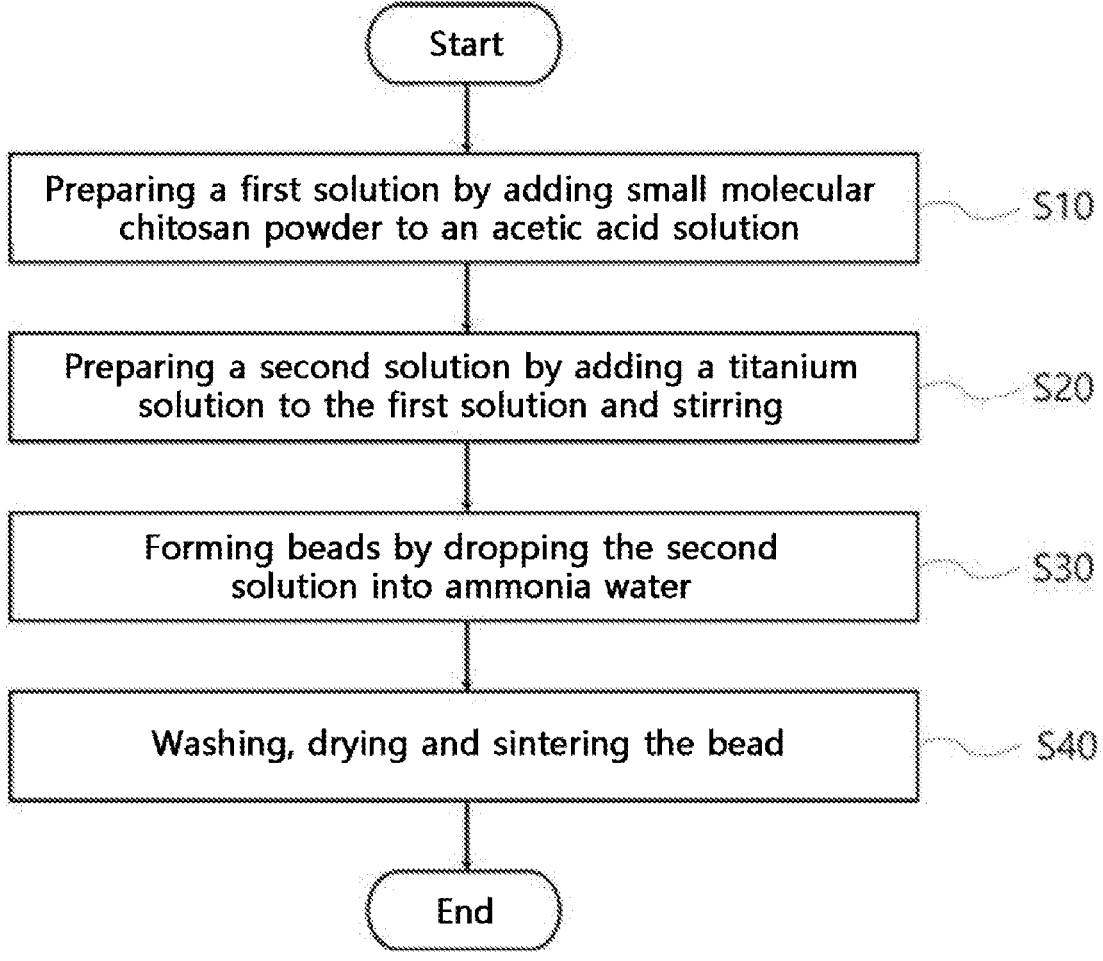
FIG. 2 is a flowchart for explaining a method of manufacturing a small molecular chitosan-titanium composite according to an embodiment of the present invention.

Hereinafter, embodiments of the present invention will be described in more detail.

Objects, features and advantages of the present invention will be easily understood through the following embodiments. The present invention is not limited to the embodiments described herein, and may be embodied in other forms. The embodiments introduced herein are provided so that the spirit of the present invention can be fully understood by those of ordinary skill in the art to which the present invention pertains. Therefore, the present invention should not be limited by the following embodiments, and should be understood to include all modifications, equivalents, and substitutes included in the spirit and scope of the present invention.

In the specification, terms such as first, second, etc. may be used to describe various components, but the components should not be limited by the terms.

The above terms are used only for the purpose of distinguishing one component from another. For example, without departing from the scope of the present invention, a first component may be referred to as a second component, and similarly, a second component may also be referred to as a first component.

The terms used in the present application are only used to describe specific embodiments, and are not intended to limit the present invention.

Singular expressions include plural expressions unless the context clearly implies otherwise. In the present application, terms such as "comprise" or "have" are intended to designate that a feature, number, step, operation, component, part or combination thereof described in the specification is present, but should not be construed to preclude the possibility of the presence or addition of one or more other features, numbers, steps, operations, components, parts or combinations thereof.

The present invention provides a method for manufacturing a chitosan-titanium composite, the method including: a step of preparing a first solution by adding small molecular chitosan powder to an acetic acid solution: a step of preparing a second solution by adding a titanium solution to the first solution: a step of forming a bead by dropping the second solution into ammonia water; and a step of washing, drying and sintering the bead.

According to the present invention, by applying a titanium crosslinking material to small molecular chitosan, the bead formation elution pressure can be lowered, and thus beads of a desired size can be advantageously formed.

When using medium to high molecular weight chitosan, there is a disadvantage that the adsorption/desorption capacity of $^{68}Ge/^{68}Ga$ may be lowered because a large size (700 um) bead is formed.

The small molecular chitosan may have a molecular weight of 50,000 to 190,000 Daltons.

The titanium solution may be a titanium propoxide solution or a titanium isopropoxide solution.

In the step of forming beads by dropping the second solution into aqueous ammonia, the falling flow rate of the second solution may be adjusted to 5 to 10 mL/min, more preferably 7 mL/min.

By adjusting the falling flow rate within the above range, beads having a diameter of 200 to 400 μm, more preferably 250±20 μm can be formed, thereby realizing the effects of acid resistance and high adsorption/desorption capacity of $^{68}Ge/^{68}Ga$.

By reducing the size of the beads, stability against acid, which is an eluent, can be secured, and an area where metal ions react with the adsorbent can increase, thereby also improving the effects of the adsorption/desorption capacity of $^{68}Ge/^{68}Ga$.

The sintering step may be performed at 400 to 500° C. for 6 to 8 hours, and more preferably, for 6 hours at 450° C. with a temperature increase of 10° C./min.

By controlling the sintering reaction time as described above to ensure the stability of the composite (radioactive isotope adsorbent), the $^{68}Ge/^{68}Ga$ adsorption/desorption capacity can be improved.

Figure 5:
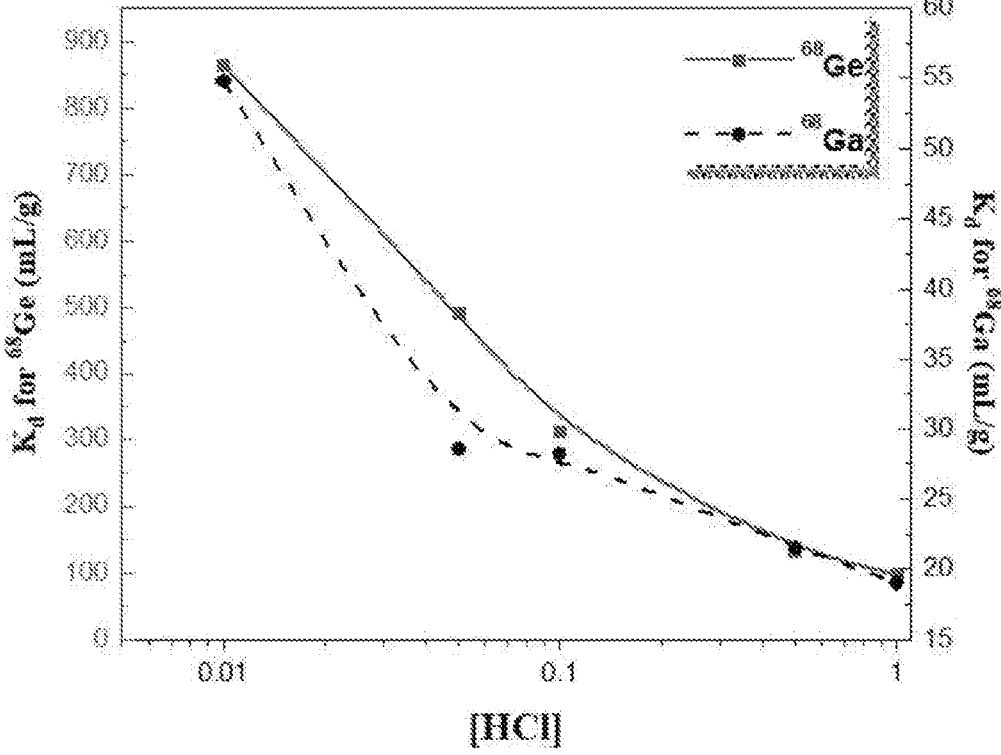
FIG. 5 is a graph of a $K_d$ value of a small molecular chitosan-titanium composite having a sintering reaction time of 3 hours.
Figure 6:
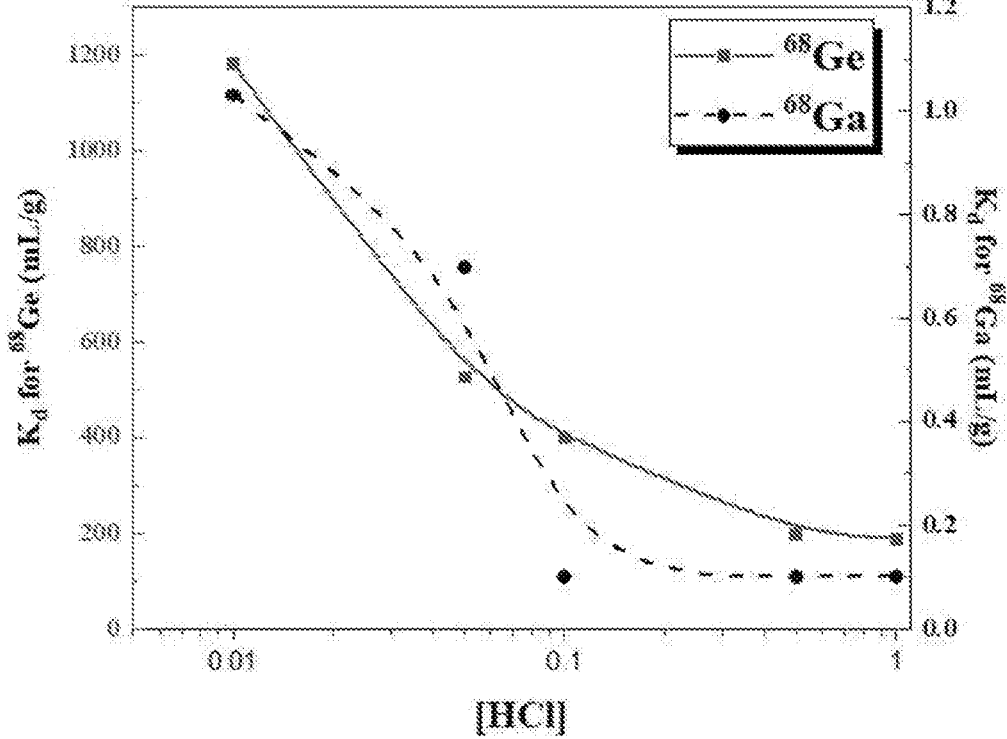
FIG. 6 is a graph of a $K_d$ value of a small molecular chitosan-titanium composite having a sintering reaction time of 6 hours.

By controlling the sintering reaction conditions more specifically as described above, it is possible to increase the adsorption capacity of Ge-68 and the desorption capacity of Ga-68 by 360 times or more with stability against the acid which is an eluent (see FIGS. 5 and 6).

The chitosan-titanium composite may be used for the adsorption of radioactive isotopes.

The radioactive isotope may be $^{68}Ge$.

In addition, the present invention provides a method for obtaining a radioactive isotope, the method comprising: a step of adsorbing a parent nuclide to the chitosan-titanium composite prepared according to the above method, and then contacting it with an eluent to elute a daughter nuclide.

The parent nuclide may be $^{68}Ge$, and the daughter nuclide may be $^{68}Ga$.

The eluent may be an acid solution, more specifically hydrochloric acid.

Here, the concentration of hydrochloric acid may be 0.01 to 0.2 M, more preferably 0.02 to 0.1 M, even more preferably 0.03 to 0.06 M.

Further, the present invention may provide a chitosan-titanium composite for adsorption of radioactive isotopes, in which titanium is crosslinked to small molecular chitosan as an inert support.

The composite may include anatase crystals having a size of 167±40 Å and rutile crystals having a size of 653±25 Å.

Hereinafter, with reference to the accompanying drawings, preferred embodiments of the present invention will be described in more detail.

Ga-68, which is used in positron emission tomography for the diagnosis of various diseases, is produced by a $^{68}Ge/^{68}Ga$ generator, and its effectiveness has been proven and the demand in hospitals and research institutes is rapidly increasing. However, a study on column filler, a key element of the $^{68}Ge/^{68}Ga$ generator, and the stability due to long-term use by eluent is very insufficient.

In the present invention, a new column filler capable of efficiently producing Ga-68, a daughter nuclide, in the $^{68}$Ge/$^{68}$Ga generator, was synthesized.

In previous studies, metal oxides such as TiO$_2$, ZnO$_2$, Al$_2$O$_3$, etc. were used as fillers for the columns of the $^{68}$Ge/$^{68}$Ga generators, but studies on the stability in hydrochloric acid used as the eluent are insufficient; and in the case of using a nano-sized filler, there is a disadvantage that, when Ga-68, the daughter nuclide, is eluted, high pressure is generated and Ge-68, the parent nuclide, and the filler are released together, thereby making it impossible to use it for a long time.

In addition, most of the metal oxides used as column fillers can cause toxicity in vivo, and Ga-68 must be purified once more upon elution in order to use it as a radiopharmaceutical. In the present invention, there has been synthesized a microsphere-type filler based on small molecular chitosan having excellent absorption/desorption capacity of $^{68}$Ge/$^{68}$Ga while overcoming the above disadvantages, whereby a low elution pressure has been realized and the toxicity problem has been solved by the use of chitosan. According to the present invention, Ge-68 can be eluted at low pressure (gravity). Further, as a result of conducting evaluation of the stability against acids and a study on the K$_d$ value using $^{68}$Ge, a parent nuclide, and $^{68}$Ga, a daughter nuclide, excellent K$_d$ value and stability of the synthesized small molecular chitosan microspheres have been confirmed.

FIG. 1 is a conceptual diagram illustrating the principle of a $^{68}$Ge/$^{68}$Ga radioactive isotope generator using a small molecular chitosan titanium composite according to an embodiment of the present invention.

As shown in FIG. 1, a generator 100 includes a small molecular chitosan-titanium composite according to an embodiment of the present invention and $^{68}$Ge therein.

The $^{68}$Ge is adsorbed to the small molecular chitosan-titanium composite and disposed inside the generator. In this case, $^{68}$Ge is collapsed into $^{68}$Ga inside the generator, and may exist in a state of $^{68}$Ge/$^{68}$Ga adsorbed to the small molecular chitosan-titanium composite.

The radioactive isotope generator 100 includes an input unit 110 for injecting an acid solution, a reaction unit 120 for reacting the acid solution with the small molecular chitosan-titanium composite 122 to which $^{68}$Ge/$^{68}$Ga is adsorbed, and a discharge unit 130 for discharging the reacted solution formed by reacting the acid solution.

The discharge unit may further include a filter for filtering the reacted solution.

Since the $^{68}$Ga can be eluted by reacting with an acid solution, the acid solution is inserted into the input unit 110 of the radioactive isotope generator.

The inserted acid solution may be an HCl solution. The acid solution passes through the reaction unit 120 and reacts with the small molecular chitosan-titanium adsorbent 122 to which the $^{68}$Ge/$^{68}$Ga is adsorbed, and the $^{68}$GaCl$_3$ solution is discharged to the discharge unit 130, whereby the $^{68}$Ga can be obtained with high purity. Here, the concentration of HCl solution may be 0.01 to 0.2 M, more preferably 0.02 to 0.1 M, even more preferably 0.03 to 0.06 M.

Hereinafter, a method for preparing the small molecular chitosan-titanium adsorbent and the performance of the small molecular chitosan-titanium adsorbent will be described in detail by way of examples and experimental examples.

<Example 1> Preparation of Small Molecular Chitosan-Titanium Adsorbent 1.5 g of small molecular chitosan as a template was added to 5 v/v % acetic acid and stirred for 24 hours to prepare a first solution.

In this case, as the small molecular chitosan, a powder having a medium viscosity (20 to 300 cP) may be used. Then, 2.4 mL of distilled water was added to 36 mL of ethanol (70 v/v %) and stirred for 1 minute: 6 mL of hydrochloric acid and 45 mL of a solution containing 98 wt/v % of titanium propoxide are sequentially added thereto and stirred for 1 hour; and then 10 g of TiO$_2$/P25 was added thereto and stirred for 16 hours to prepare a solution, which was added to the prepared first solution and stirred for 2 hours to prepare a second solution. Then, the second solution was dropped from a height of 30 cm to 28 v/v % ammonia water at a flow rate of 7 mL/min using a syringe pump and a 27G (gauge) syringe needle to form beads, which was washed with distilled water 10 times or more, dried at 80° C. for 6 hours, and sintered in an electric furnace at 450° C. (10° C./min) for 6 hours to prepare a small molecular chitosan-titanium adsorbent.

Figure 3:
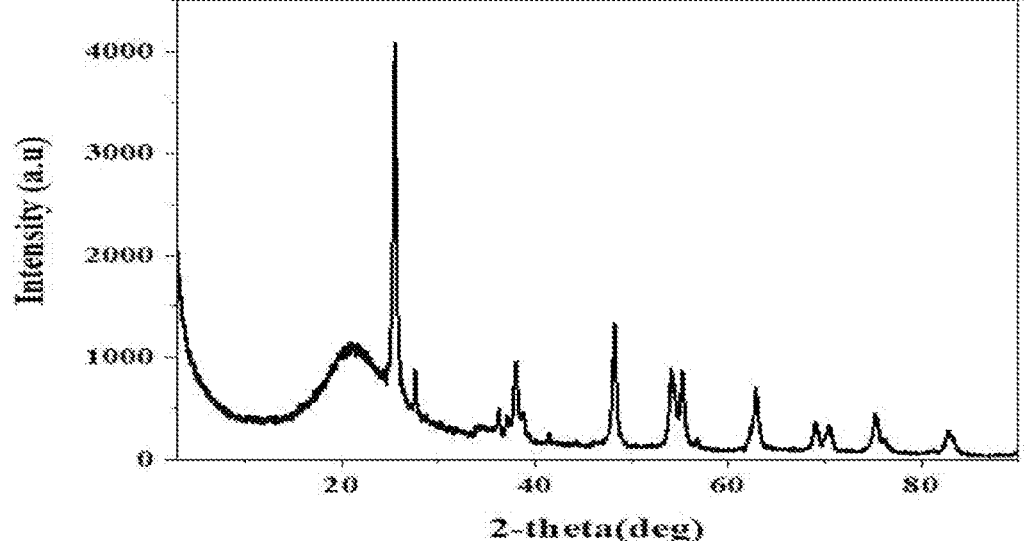
FIG. 3 is a view showing a result of X-ray diffraction analysis of a small molecular chitosan-titanium of the present invention.

<Experimental Example 1> X-Ray Diffraction Analysis of Small Molecular Chitosan-Titanium Composite The results of X-ray diffraction analysis of the small molecular chitosan-titanium adsorbent according to Example 1 were shown in FIG. 3.

As shown in FIG. 3, an XRD pattern including anatase and rutile in the form of titanium oxide, and a crystallinity of >99% were confirmed. In addition, the crystal sizes of the small molecular chitosan-titanium composite were 167±40 Å and 653±25 Å, respectively, for anatase and rutile, confirming that the crystals were present in a relatively large form.

Figure 4:
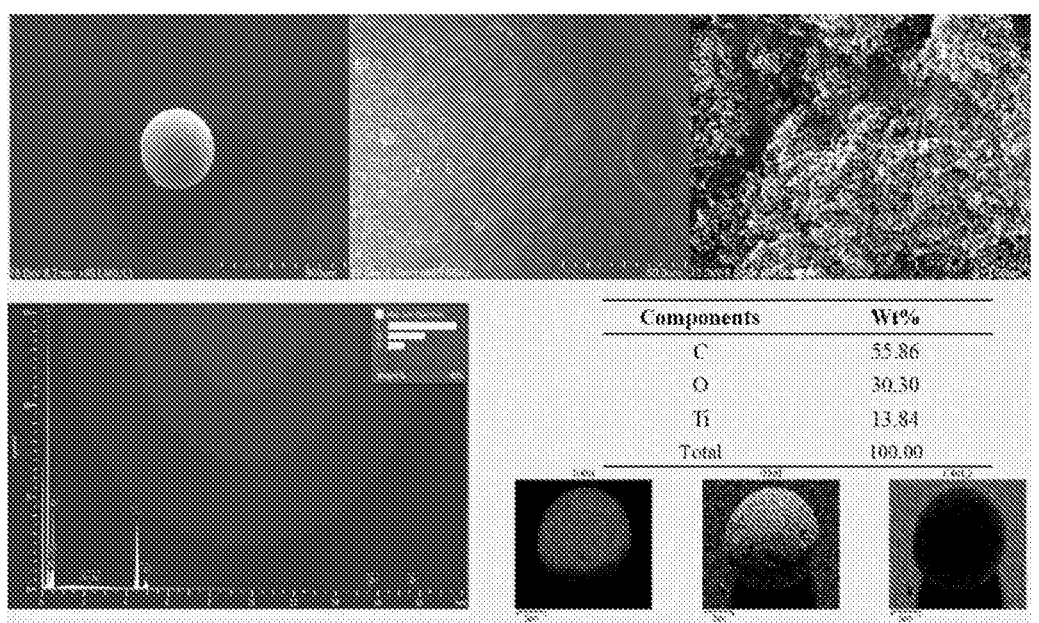
FIG. 4 is a diagram showing a result of scanning electron microscope-element map image analysis of a small molecular chitosan-titanium composite according to an embodiment of the present invention.

<Experimental Example 2> Scanning Electron Microscope and Mapping Analysis of Small Molecular Chitosan-Titanium Composite The results of scanning electron microscope-element map image analysis of the small molecular chitosan-titanium adsorbent according to Example 1 were shown in FIGS. 4A to 4C.

From the analysis results of FIGS. 4A to 4C, the small molecular chitosan-titanium composite was confirmed to have an oval shape and a size of about 250 μm×350 μm, and to be composed of about 56% carbon, about 30% oxygen, and about 14% titanium.

<Experimental Example 3> Measurement of K$_d$ Value Using Radioactive Isotopes $^{68}$Ge and $^{68}$Ga The $^{68}$Ge/$^{68}$Ga adsorption/desorption capacity may be evaluated through an experiment in which $^{68}$Ge, a parent nuclide, is sufficiently adsorbed to a small molecular chitosan-titanium adsorbent, and then $^{68}$Ga, its daughter nuclide, is eluted using an eluent (hydrochloric acid), so that the elution capacity can be evaluated by eluting $^{68}$Ga with eluents of various concentrations, and the adsorption capacity of the adsorbent for $^{68}$Ge, a parent nuclide, can be evaluated.

The K$_d$ value is a partition coefficient and is an adsorption equilibrium constant depending on an adsorbate concentration or an adsorbent dose.

The Kd values for $^{68}$Ge and $^{68}$Ga are tested according to the concentration of hydrochloric acid used as an eluent.

$$K_d = \frac{(C_0 - C)/W}{C/V} \text{mL/gm}$$

Equation (1) is a formula to obtain the $K_d$ value, where Co is an initial amount of radioactivity, C is an amount of radioactivity at radiation equilibrium, W is the weight of the adsorbent, and V is the total volume of the solution. As can be seen from Equation (1), the denominator represents an adsorbed amount per unit mass of the adsorbent under the adsorption equilibrium condition, and the numerator represents an adsorbate equilibrium concentration in the solution after adsorption equilibrium.

By measuring the $K_d$ value through Equation (1), it is possible to predict under which eluent conditions the adsorbent has the best adsorption and desorption capacity for the parent and daughter nuclides.

In order to measure the $K_d$ value of $^{68}$Ge, 50 mg of each sample and $2.0 \times 10^6$ CPM (count per minute) of $^{68}$Ge/$^{68}$Ga equilibrium solution were put into a 15 mL tube, and then were reacted with 2 mL of each of 0.01, 0.05, 0.1, 0.5 and 1.0 M HCl in a shaking incubator at 200 rpm for 1 hour and 30 minutes. In order to measure the $K_d$ value of $^{68}$Ga, 50 mg of each sample and $2.0 \times 10^6$ CPM of $^{68}$Ga eluate eluted from the $^{68}$Ge/$^{68}$Ga generator were put into a 15 mL tube, and then were reacted with 2 mL of each of 0.01, 0.05, 0.1, 0.5 and 1.0 M HCl in a shaking incubator at 200 rpm for 1 hour and 30 minutes. In order to measure the amount of radioactivity of each $^{68}$Ge/$^{68}$Ga, it was stirred, filtered using a syringe filter, and then measured using a gamma counter, wherein the amount of radioactivity of $^{68}$Ga was measured immediately after filtration, and then, the amount of radioactivity of $^{68}$Ge was measured after decay for 24 hours.

FIG. 5 is a graph of the $K_d$ value of an adsorbent in which a sintering reaction time of small molecular chitosan-titanium is 3 hours, and FIG. 6 is a graph of the $K_d$ value of an adsorbent in which a sintering reaction time of small molecular chitosan-titanium is 6 hours.

Figure 7:
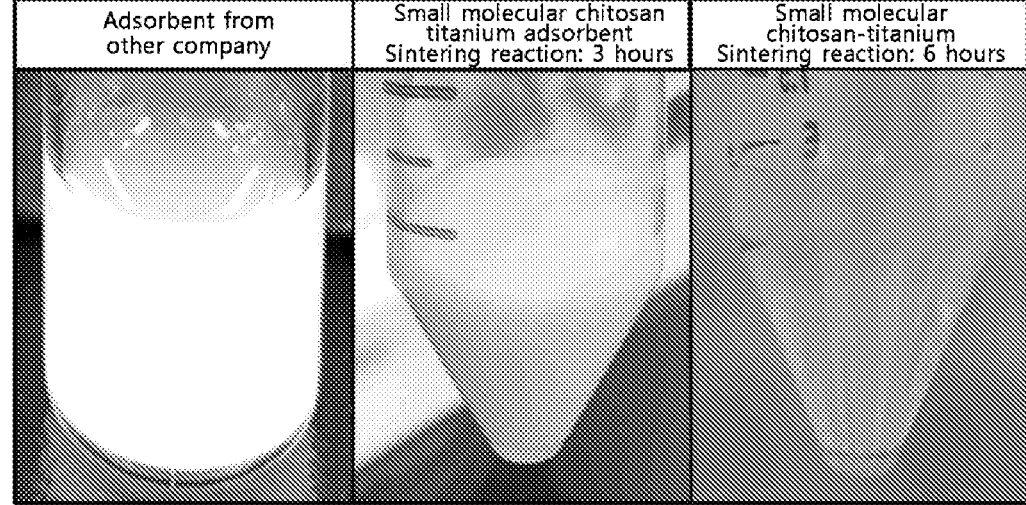
FIG. 7 is a view showing an analysis result of stability in acid according to a sintering reaction time.

FIG. 7 is a view showing the results of acid resistance according to a sintering reaction time of small molecular chitosan-titanium.

Referring to FIGS. 5, 6 and 7, it was confirmed that the present adsorbent has superior acid resistance than the conventional adsorbent, a titanium adsorbent made by other company: in the case of the small molecular chitosan-titanium composite with a sintering reaction time of 6 hours, the $K_d$ values of Ge-68 and Ga-68 at the concentration of 0.01 M hydrochloric acid were 1180.3 and 1.03, and a separation factor of 1145.9, respectively, showing very good separation performance; and the effect of adsorption/desorption capacity was confirmed, in which the separation factor increased 70 times or more from 15.7 to 1145.9 by increasing the sintering time of the column filler from 3 hours to 6 hours. From the above, it was found that the small molecular chitosan-titanium composite sintered for a long time binds better to $^{68}$Ge, a parent nuclide, and selectively elutes $^{68}$Ga, a daughter nuclide selectively eluted $^{68}$Ga, a daughter nuclide.

Figure 8:
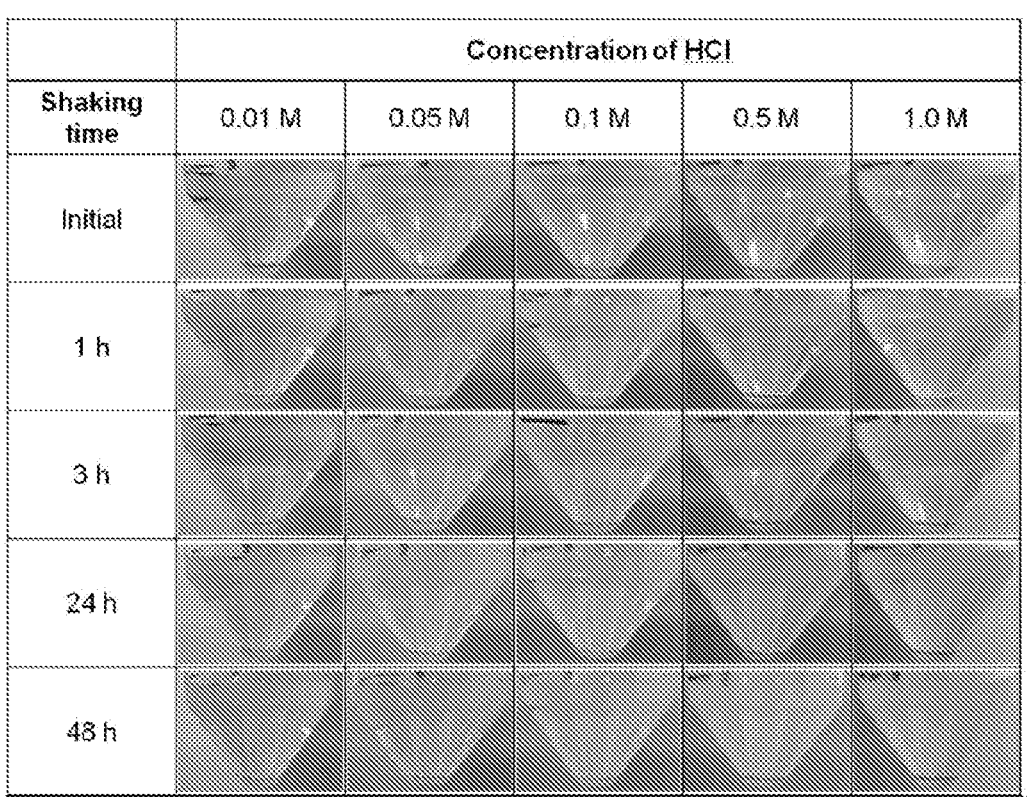
FIG. 8 is a view showing a result of stability analysis of a small molecular chitosan-titanium composite according to an embodiment of the present invention.

<Experimental Example 4> Stability Analysis of Small Molecular Chitosan-Titanium Composite The stability of the small molecular chitosan-titanium composite was analyzed at various acid concentrations, and the results are shown in FIG. 8.

In order to evaluate the stability against acid, 50 to 100 mg of the small molecular chitosan-titanium composite was added to 0.01 M to 1.0 M HCl, and physical stress was applied at room temperature and 300 rpm using a shaking incubator for 0, 1, 3, 24, 48 hours.

As a result of the experiment, as shown in FIG. 8, it was confirmed that the small molecular chitosan-titanium composite secured the stability against acid for a long time even in a high concentration of hydrochloric acid while subjected to physical stress.

In the foregoing detailed description of the invention, although the present invention has been described with reference to preferred embodiments thereof, it will be understood that various modifications and changes can be made to the present invention by those skilled in the art or those having ordinary skill in the art without departing from the spirit and scope of the present invention described in the claims to be described later.

DESCRIPTION OF REFERENCE NUMERALS AND SYMBOLS

100: Generator
110: Input unit
120: Reaction unit
122: Chitosan-titanium composite
130: discharge unit

The invention claimed is:

1. A method for manufacturing a chitosan-titanium composite, the method comprising:

a step of preparing a first solution by adding small molecular chitosan powder to an acetic acid solution;

a step of preparing a second solution by adding a titanium solution to the first solution;

a step of forming a bead by dropping the second solution into ammonia water; and a step of washing, drying and sintering the bead, wherein the small molecular chitosan has a molecular weight of 50,000 to 190,000 Da, and wherein the bead has a diameter of 200 to 400 μm.

2. The method according to claim 1, wherein in the step of forming beads by dropping the second solution into aqueous ammonia, the falling flow rate of the second solution is adjusted to 5 to 10 mL/min.

3. The method according to claim 1, wherein the sintering step is performed at 400 to 500° C. for 6 to 8 hours.

4. The method according to claim 1, wherein the chitosan-titanium composite is used for the adsorption of radioactive isotope.

5. The method according to claim 4, wherein the radioactive isotope is $^{68}$Ge.

* * * * *